UNITED STATES PATENT OFFICE.

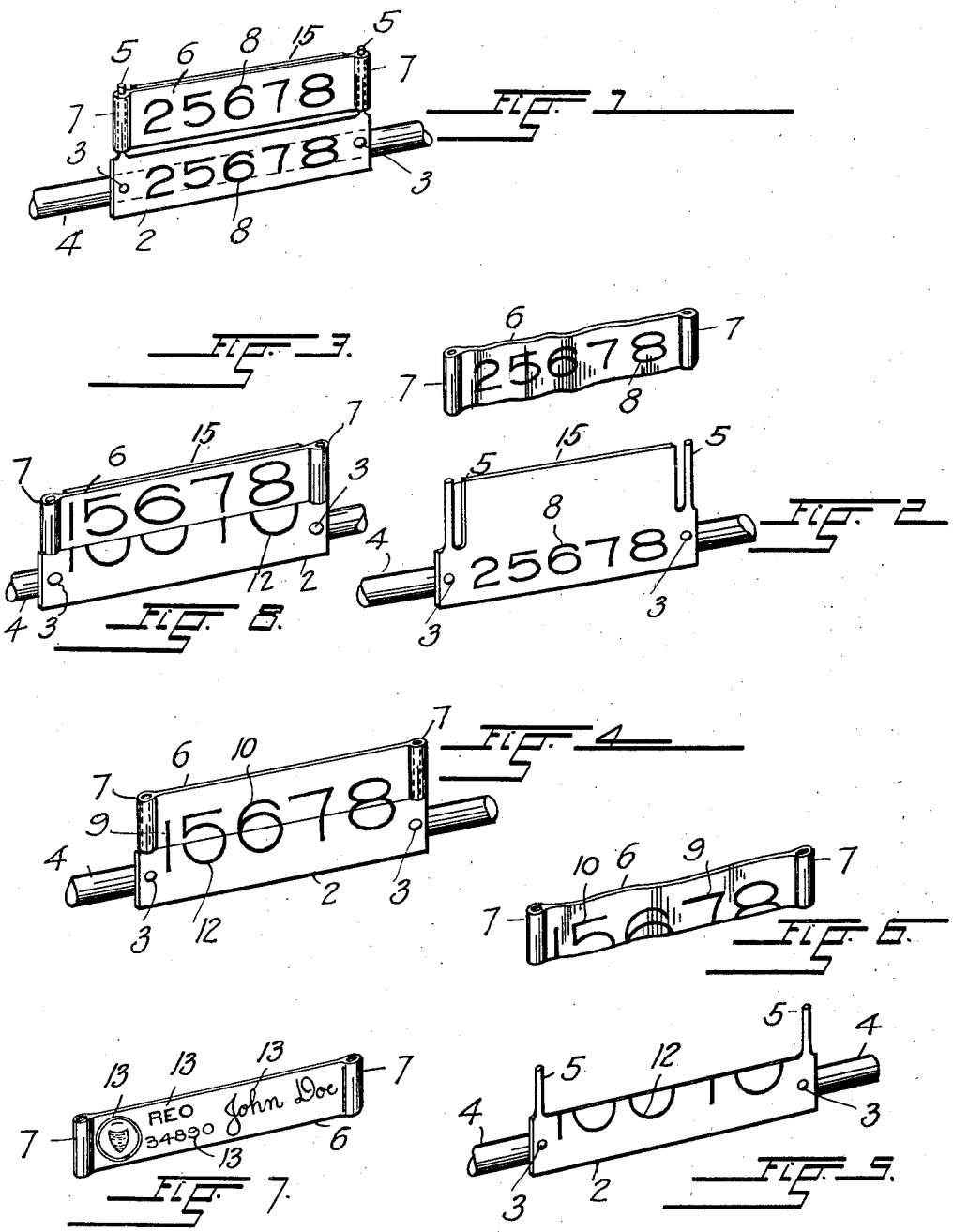

JOHN L. ALKIRE, OF DENVER, COLORADO.

LICENSE TAG.

1,408,059.

Specification of Letters Patent.  Patented Feb. 28, 1922.

Application filed February 14, 1918. Serial No. 217,060.

*To all whom it may concern:*

Be it known that I, JOHN L. ALKIRE, a citizen of the United States, residing at Denver, in the county of Denver and State of Colorado, have invented certain new and useful Improvements in License Tags, of which the following is a sepcification.

My invention relates to new and useful improvements in license-tags for motor-vehicles, and its primary object resides in the provision of a sectional license-tag which by the absence of one or more of its parts, indicates an irregular condition of the vehicle to which it is attached and thereby serves as a medium to prevent theft.

With the above object in view, my improved license-tag in its preferred form is made of two complementary parts one of which is rigidly secured to the vehicle, while the other is mounted so that it may be readily removed and replaced.

The members of the license-tag bear identical license numbers or complementary parts of one number and the removable member may bear in addition thereto, an impression of the seal of the State or county by which the license is issued, the factory number of the particular vehicle for which the license is given, the names of the car and the owner thereof, or any other distinctive identification mark.

The removable part of the license-tag is preferably made of some flexible substance such as rubber, leather or cloth so that it may be rolled or folded in small compass to be carried in a coat-pocket or placed in a small receptacle on the vehicle.

When the driver of a car to which a license-tag of the above-described character is attached, "parks" the vehicle, he removes the loose member of the license-tag and either caries it with him or locks it in a receptacle of the vehicle.

It is best, however, to completely remove the tag-member from the vehicle and thereby lessen the danger of its being appropriated for use in obtaining possession of the vehicle by dishonest means.

It will be readily seen that inasmuch as the two members of the license-tag bear complementary parts of the license-notice and the tag is incomplete without both parts being in their proper relative positions, and further considering the fact that every precaution has been taken against imitating the removable member, it becomes a comparatively easy matter to detect a stolen car without close inspection.

In order to make the absence of the removable member of the tag more noticeable, a back-plate which is either an integral part of the stationary member of the license-plate, or is rigidly connected therewith, and which normally is covered by the removable member, is painted in a conspicuous color, preferably red or white, so that after the detachable member of the license-tag has been removed, its absence will be readily noticeable at a considerable distance from the vehicle.

An embodiment of my invention in its two preferred forms has been shown in the accompanying drawings in the various views of which like parts are similarly designated, and in which—

Figure 1 is a perspective view of my improved license-tag, the members of which bear identical license numbers, Figure 2, is a similar view of the fixed member thereof, Figure 3, a similar view of the removable member of the tag, separate from the other, Figure 4, a perspective view of a license tag in which the members bear complementary parts of one license-number, Figure 5, a simiar view of a fixed part of the license-tag shown in Figure 4, Figure 6, a similar view of the removable member of the same, Figure 7, a reverse view of the parts shown in Figure 6, and Figure 8, a perspective view of a license-tag in which the removable member bears a complete license-number, and the stationary member bears a fraction thereof.

The reference numeral 2 designates the fixed member of the license-tag which by means of rivets, bolts or other suitable fastening means 3 is securely locked upon a part of the vehicle, such as the bar 4 shown in the drawings.

Fixed at opposite ends of the members 2 are two upwardly extending pins 5 for the attachment of the removable member 6 of the tag which to this end is provided with sleeves 7 which fit upon the pins as shown in Figures 1 and 4.

A back-plate 15 formed integrally with the fixed member 2 of the license-tag, extends upwardly therefrom between the two pins and is normally covered by the removable tag. The face of the back-plate is painted in a conspicuous color, preferably a color differing from that of the fixed part of the license-plate, so that after the member 6 of the tag is removed, its absence will be readily noticed. It will be understood, however, that the provision of a back-plate is not positively essential and that it may be omitted as shown in the modification of my invention illustrated in Figures 5 and 6.

The body-portion of the removable member is made of rubber, leather, canvas or any other suitable flexible material which at its ends is either fastened to the sleeves or forms an integral part thereof.

In the form of my invention shown in Figures 1 to 3, the two members of the tag, bear the same license-numbers 8 which together constitute the complete license notice prescribed by the laws of the State or community by which the licenses are issued, and in the form shown in Figures 4 to 6, the license-notice consists of a single number, word or other distinctive mark 9 which is longitudinally divided into two complementary parts 10 and 12, which are printed or otherwise affixed upon the two members of the tag.

When the license-notice in the last-described form of my invention, consists of a series of letters or numerals as shown in the drawings, it is of advantage that one of the complementary parts thereof, such as that printed on the stationary member in the illustration shown in the drawings, is unintelligible without the other, thereby making it still more difficult for a dishonest person to replace the missing part.

In the license-tag shown in Figures 4 to 6, the numerals, 1, 5, 6, 7 and 8 are so divided that their fractions appearing on the stationary member of the tag may constitute parts of different numbers or letters. For example, the first and fourth marks on the member 2 may be part of the numerals 1, 4 or 7, and the other marks may be fractions of the numerals 3, 5, 6, 8 or 9.

In the form of my invention shown in Figure 8, the removable member of the tag bears the entire license-number and the stationary member bears a fraction thereof. The proper relation between the two parts of the tag is established by comparison of the fragmental marks on the stationary member with the corresponding portion of the number on the removable member, the advantage of this form of the invention being that it does not require the exact registration of the parts of the license-notice on the two members of the tag, which is easily disturbed by stretching or shrinking of the flexible material of which the removable member is composed.

The removable member of the tag bears, preferably upon its reverse side, certain identification marks 13 which are impressed thereon by burning, stamping or any other method which protects against alteration or erasure.

In Figure 7 of the drawings these identification-marks have been shown to consist of an impression of the seal of the State, the name and number of the vehicle, and the name of the owner of the same.

It will be understood that any one of these or similar marks, may be used without the others and that in case the identification mark includes the factory-number of the vehicle, it is of advantage to have the number also impressed in nonerasable and nonalterable characters upon a fixed portion of the vehicle.

It should furthermore be understood that the means shown in the drawings for fastening the parts of the license-tag are merely illustrative of many suitable devices that may be employed for this purpose, that while the license-notice has been shown in the drawings to consist of numbers, it may be composed of letters, words or other distinguishing marks, and that variations in the form of the tag and the arrangement of its parts may be availed of within the spirit of the invention as set forth in the following claims:

1. A license-tag composed of a stationary part and a removable part which bear complementary parts of a license-notice, and a conspicuously colored back-plate which is fixed with relation to the stationary part of the tag and is normally covered by the removable part of the same.

2. A license-tag comprising in combination, a fixed member, pins extending upwardly at opposite ends thereof, a flexible member, and sleeves on said flexible member, cooperative with the pins for stretching it in a plane with a face of the other member, the two members bearing upon corresponding faces, complementary parts of a license-notice.

3. A license tag comprising a fixed plate having upstanding pins at its ends and a complementary removable member formed of flexible material and provided with sleeve portions at its ends fitting the aforesaid upstanding pins.

4. A license tag comprising a vertical fixed member, a flexible complementary member removably engaged at its ends with the aforesaid member and an integral extension on said fixed member forming a back plate for said flexible member.

5. A license tag comprising a vertical fixed plate having upstanding pins at its ends, a complementary removable member formed of flexible material and provided with sleeve portions at its ends engaging said pins, and an extension on said plate between said pins forming a back plate for the aforesaid removable member.

6. A license tag comprising two complementary members, one of which is flexible and removable, the two members having cooperative means for fastening the flexible member in a taut condition and in a determinate position with relation to the other.

7. A license tag composed of a stationary part bearing a license number, and a relatively movable part, the tag having a portion of conspicuous color which is exposed by a displacement of said movable part.

In testimony whereof I have affixed my signature in presence of two witnesses.

JOHN L. ALKIRE.

Witnesses:
G. J. ROLLANDET,
L. RHOADES.